(12) United States Patent
Zheng et al.

(10) Patent No.: US 12,549,801 B2
(45) Date of Patent: Feb. 10, 2026

(54) LYRIC VIDEO DISPLAY METHOD AND DEVICE, ELECTRONIC APPARATUS AND COMPUTER-READABLE MEDIUM

(71) Applicant: BEIJING ZITIAO NETWORK TECHNOLOGY CO., LTD., Beijing (CN)

(72) Inventors: Niwen Zheng, Beijing (CN); Lei Sun, Beijing (CN); Jia Qu, Beijing (CN); Hao Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 47 days.

(21) Appl. No.: 17/438,732

(22) PCT Filed: Jun. 25, 2021

(86) PCT No.: PCT/CN2021/102438
§ 371 (c)(1),
(2) Date: Sep. 13, 2021

(87) PCT Pub. No.: WO2022/100103
PCT Pub. Date: May 19, 2022

(65) Prior Publication Data
US 2022/0394325 A1    Dec. 8, 2022

(30) Foreign Application Priority Data

Nov. 10, 2020   (CN) .......................... 202011247956.3

(51) Int. Cl.
*H04N 21/431*   (2011.01)
*H04N 21/435*   (2011.01)

(52) U.S. Cl.
CPC ..... *H04N 21/4316* (2013.01); *H04N 21/4355* (2013.01)

(58) Field of Classification Search
CPC .......... H04N 21/4316; H04N 21/4355; G10H 1/368; G10H 2220/011
See application file for complete search history.

(56) References Cited

U.S. PATENT DOCUMENTS 9,456,170 B1 *   9/2016   Miller .................... G11B 27/10
11,263,817 B1 *  3/2022   Goodrich ............... G06T 7/246
(Continued)

FOREIGN PATENT DOCUMENTS

CN      104219559 A    12/2014
CN      107943964 A    4/2018
(Continued)

OTHER PUBLICATIONS

Reexamination Notice issued Feb. 1, 2023 in Chinese Application No. 202011247956.3, with English translation (11 Pages).
(Continued)

*Primary Examiner* — Michael R Telan

(57) ABSTRACT

The present disclosure provides a lyric video display method and device, an electronic apparatus, and a computer-readable medium. The method includes: playing, based on a lyric video display operation of a user, multimedia data and data about music to be displayed, the multimedia data including image data, and the music data including audio data and lyrics; determining a target time point, determining a target object in the image data corresponding to the target time point, and determining target lyrics in the lyrics corresponding to the target time point; and displaying the target lyrics within a preset range of a position of the target object in the target image, and adjusting display effects of the target lyrics based on depth information of the target object, while playing a part of the audio data corresponding to the target lyrics.

17 Claims, 5 Drawing Sheets

(56) References Cited

U.S. PATENT DOCUMENTS

| | | | | |
|---|---|---|---|---|
| 2004/0189868 A1* | 9/2004 | Molaro | ............. | H04N 21/4884 348/600 |
| 2010/0188572 A1* | 7/2010 | Card, II | ................. | H04N 5/445 348/E7.001 |
| 2011/0018966 A1* | 1/2011 | Kitazato | .............. | H04N 13/194 348/E13.001 |
| 2011/0107216 A1* | 5/2011 | Bi | ......................... | G06F 3/0481 715/863 |
| 2012/0002946 A1* | 1/2012 | Antonellis | ........... | H04N 13/156 386/E5.009 |
| 2012/0007949 A1* | 1/2012 | Lee | ...................... | H04N 13/183 348/43 |
| 2013/0141551 A1* | 6/2013 | Kim | ....................... | H04N 5/445 348/51 |
| 2017/0371498 A1* | 12/2017 | Imade | ................... | G06F 3/0481 |
| 2019/0147229 A1* | 5/2019 | Zatepyakin | .......... | G06V 40/161 382/103 |
| 2019/0394419 A1* | 12/2019 | Zhang | ................ | H04N 21/4316 |
| 2020/0168198 A1* | 5/2020 | Lao | ........................ | G10H 1/361 |

FOREIGN PATENT DOCUMENTS

| | | |
|---|---|---|
| CN | 107944397 A | 4/2018 |
| CN | 108089830 A | 5/2018 |
| CN | 112383810 A | 2/2021 |
| JP | 2011007868 A | 1/2011 |
| WO | 2020105847 A1 | 5/2020 |

OTHER PUBLICATIONS

Reexamination Decision issued Mar. 20, 2023 in Chinese Application No. 202011247956.3, with English translation (20 Pages).

Office Action issued Jun. 6, 2022 for CN Application No. 202011247956.3, with English translation (12 Pages).

International Patent Application No. PCT/CN2021/102438, International Search Report mailed Sep. 23, 2021, 4 pages.

Chinese Patent Application No. 202011247956.3, First Office Action and Search Report mailed Nov. 3, 2021, 9 pages with English Translation.

Office Action received for ID Patent Application No. P00202107523, mailed on Dec. 14, 2023, 4 pages (2 pages of English Translation and 2 pages of Original Document).

Office Action received for IN Patent Application No. 202127040928, mailed on Sep. 4, 2024, 7 pages.

Office action received from Indonesia patent application No. P00202107523 mailed on Jun. 30, 2025, 6 pages (3 pages English Translation and 3 pages Original Copy).

* cited by examiner

LYRIC VIDEO DISPLAY METHOD AND DEVICE, ELECTRONIC APPARATUS AND COMPUTER-READABLE MEDIUM

CROSS-REFERENCE TO RELATED APPLICATION

This application is a U.S. 371 Application of International Patent Application No. PCT/CN2021/102438, filed on 25 Jun. 2021, which application claims priority to Chinese patent application No: 202011247956.3, filed on Nov. 10, 2020 by Beijing Zitiao Network Technology Co., Ltd, entitled with "lyric video display method, device, electronic apparatus and computer-readable medium", the entire contents of which are incorporated herein by reference.

TECHNICAL FIELD

The present disclosure relates to the technical field of video processing. Specifically, the present disclosure relates to a lyric video display method and device, an electronic apparatus, and a computer-readable medium.

BACKGROUND

With the development of video technology, people's requirements for music videos increase accordingly. The appearance of music lyrics in a music video has already been a very common feature.

In an existing music video, lyrics scrolls or translates at the bottom of the video when the music is played. Some technologies also have a function of coloring the lyrics, but these simply superimpose the lyrics with the video. The entry and exit of the lyrics are merely basic effects. In addition, for a lyric video with a background, the lyrics are completely separated from the background with no correlation, resulting in a poor experience for users to watch the lyric video. Further, since the lyrics have just some simple and mechanical basic effects, the display form of the lyrics is relatively monotonous, resulting in poor user experience.

Therefore, the related art has the technical problems that the display form of the lyrics is monotonous and that the lyrics are completely separated from the background of the video, resulting in poor user experience, which needs to be resolved.

SUMMARY

Technical Problem

The purpose of the present disclosure is to solve at least one of the above-mentioned technical defects, in particular, the technical problems that the display form of the lyrics is monotonous, and the lyrics are completely separated from the background of the video, resulting in poor user experience.

Technical Solution

In the first aspect, a lyric video display method is provided. The method includes: playing, based on a lyric video display operation of a user, multimedia data and data about music to be displayed, the multimedia data including image data, and the music data including audio data and lyrics; determining a target time point, determining a target object in the image data corresponding to the target time point, and determining target lyrics in the lyrics corresponding to the target time point; and displaying the target lyrics within a preset range of a position of the target object in the target image, and adjusting display effects of the target lyrics based on depth information of the target object, while playing a part of the audio data corresponding to the target lyrics.

In a second aspect, a lyric video display device is provided, the device includes: a data obtaining module configured to play, based on a lyric video display operation of a user, multimedia data and music data to be displayed, the multimedia data including image data, and the music data including audio data and lyrics; a lyric determining module configured to determine a target time point, determine a target object in the image data corresponding to the target time point, and determine target lyrics in the lyrics corresponding to the target time point; and a lyric display module configured to display the target lyrics within a preset range of a position of the target object in the target image, and adjust display effects of the target lyrics based on depth information of the target object, while playing a part of the audio data corresponding to the target lyrics.

In a third aspect, an electronic apparatus is provided, and the electronic apparatus includes: one or more processors; a memory; and one or more application programs stored in the memory and configured to be executed by the one or more processors to implement the above-mentioned lyrics video display method.

In a fourth aspect, a computer-readable medium is provided, and the readable storage has at least one instruction, at least one program segment, a code set, or an instruction set stored thereon, where the at least one instruction, the at least one program segment, the code set, or the instruction is configured to be loaded and executed by a processor to implement the above-mentioned lyric video display method.

Beneficial Effects

According to the embodiments of the present disclosure, the multimedia data and music data to be displayed is played in response to the lyric video display operation of the user. The multimedia data includes image data, and the music data includes audio data and lyrics. At the same time, a target object in the image data and target lyrics within the lyrics are determined, the target lyrics are displayed near the target object, and the display effects of the lyrics are adjusted based on the depth information of the target object to embed the lyrics into the real space of the image data, thereby providing the user a sensory experience of virtual display and thus better user experience.

BRIEF DESCRIPTION OF DRAWINGS

In order to illustrate the technical solutions in the embodiments of the present disclosure more clearly, the drawings that are needed in the description of the embodiments of the present disclosure will be briefly introduced below.

Figure 1:
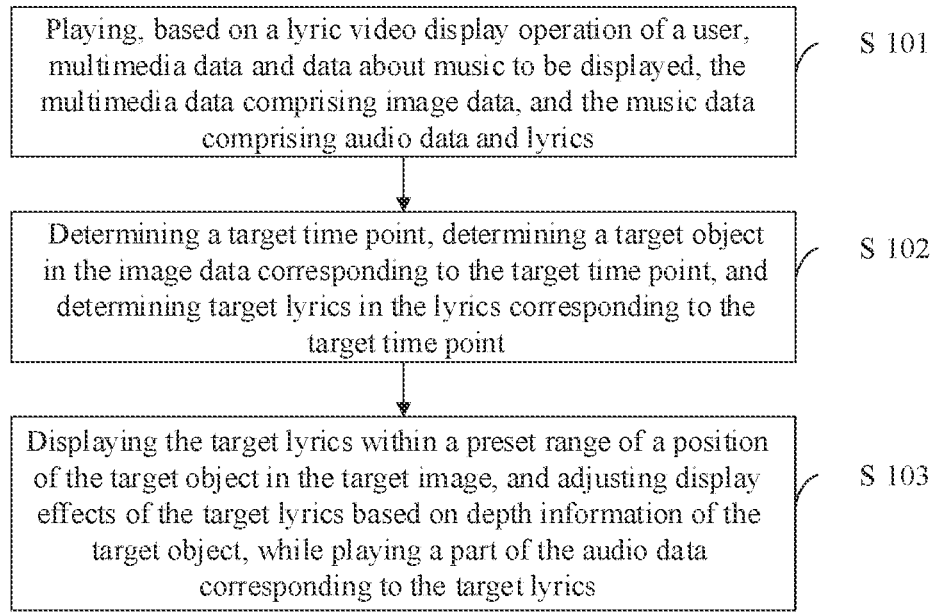
FIG. 1 is a schematic flowchart of a lyric video display method according to an embodiment of the present disclosure.

With reference to the accompanying drawings and the following specific implementations, the above and other features, advantages, and aspects of the embodiments of the present disclosure will become more apparent. Throughout the drawings, the same or similar reference numerals indicate the same or similar elements. It should be understood that the drawings are schematic and the components and elements are not necessarily drawn to scale.

DESCRIPTION OF EMBODIMENTS

Hereinafter, embodiments of the present disclosure will be described in more detail with reference to the accompanying drawings. It should be understood that, although some embodiments of the present disclosure are shown in the drawings, the present disclosure may be implemented in various forms and should not be construed as being limited to the embodiments set forth herein. On the contrary, these embodiments are provided for the purpose of providing a more thorough and complete understanding of the present disclosure. It should be understood that the drawings and embodiments of the present disclosure are only used for exemplary purposes, and are not used to limit the protection scope of the present disclosure.

It should be understood that the steps described in the method embodiments of the present disclosure may be executed in different orders, and/or executed in parallel. In addition, the method implementations may include additional steps and/or omit the illustrated steps. The scope of the present disclosure is not limited in this respect.

The terms "include" and its variants as used herein are open-ended inclusions, i.e., "including but not limited to". The term "based on" is "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts such as "first" and "second" mentioned in the present disclosure are only used to distinguish devices, modules or units, and are not used to limit that these devices, modules or units are different devices, modules or units, or to limit the order or interdependence of the functions performed by these devices, modules or units.

It should be noted that the modification terms "one" and "a plurality of" mentioned in the present disclosure are illustrative and non-restrictive, and should be understood as "one or more" by those killed in the art, unless explicitly indicated otherwise.

The names of messages or information exchanged between multiple devices in the embodiments of the present disclosure are only used for illustrative purposes, and are not used to limit the scope of these messages or information.

The lyric video display method and device, the electronic apparatus, and the computer-readable medium provided in the present disclosure are intended to solve the above technical problems in the related art.

The technical solutions of the present disclosure and how the technical solutions of the present disclosure solve the above technical problems will be described in detail below with specific embodiments. The following specific embodiments may be combined with each other, and the same or similar concepts or processes may not be repeated in some embodiments. The embodiments of the present disclosure will be described below in conjunction with the accompanying drawings.

In an embodiment of the present disclosure, a lyric video display method is provided, which is applied to a user terminal. The user terminal may be a mobile terminal such as a mobile phone or a tablet computer. The user terminal is installed with an application (APP), through which or a function of which the lyric video display method provided in the embodiment of the present disclosure may be implemented. As shown in FIG. 1, the method includes: step S101, playing, based on a lyric video display operation of a user, multimedia data and music data to be displayed, the multimedia data including image data, and the music data including audio data and lyrics; step S102, determining a target time point, determining a target object in the image data corresponding to the target time point, and determining target lyrics in the lyrics corresponding to the target time point; and step S103, displaying the target lyrics within a preset range of a position of the target object in a target image, adjusting display effects of the target lyrics based on depth information of the target object, while playing a part of the audio data corresponding to the target lyrics.

In the embodiment of the present disclosure, the multimedia data includes the image data and the music data. The image data may be pictures, animations, videos or the like with Depth Of Field (DOF) information. The music data includes the audio data and the lyrics. The depth information is information about a distance of the target object in image data from an image data collecting device, and target objects differently distanced from the image data collecting device are displayed in the image data with different imaging ratios.

For the embodiment of the present disclosure, when multimedia data and music to be synthesized are obtained, multimedia data and music stored locally, multimedia data and music on the network, or multimedia data and music recorded by the users by themselves may be obtained, where the multimedia data contain image data. Optionally, the image data may be picture data or video data.

In some embodiments, the method further includes, prior to said adjusting, based on depth information of the target object, display effects of the target lyrics; obtaining the depth information of the target object in the image data, where the depth information of the target object indicates information about a distance of the target object from a video capture device.

In an embodiment of the present disclosure, as for said obtaining the depth information of the target object in the image data, the target object refers to an object in the image data to be combined with the lyrics, and may be an object in the image data or a module area, and the depth information of the target object refers to the information used to indicate the distance of the target object from the video capture device. The deeper the depth is, the farther the distance of the target object from the video capture device has, and the shallower the depth is, the closer the distance of the target object from the video capture device has.

In the embodiment of the present disclosure, when a display position of the lyrics in the image data is adjusted based on the position of the target object in the image data, a display position of lyrics corresponding to the target object is adjusted based on the display position of the target object when the image data is being played. Optionally, when the image data is displayed through a first interface, if the target object is displayed at a position in an upper part of the image data, the lyrics are displayed in a position corresponding to the target object, i.e., the position in the upper part of the image data, or a position near the target object.

In an embodiment of the present disclosure, when the display effects of the lyrics are adjusted based on the depth information of the target object in the image data, the effects of respective lyrics patches may be adjusted according to different depth information of different target objects corresponding thereto.

Figure 2:
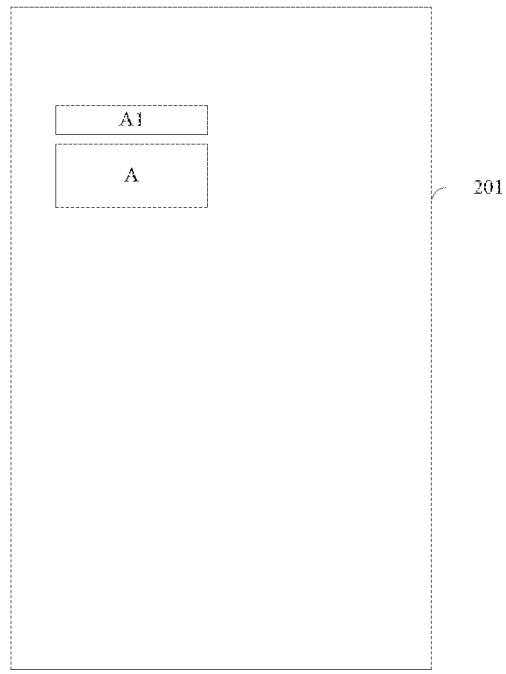
FIG. 2 is a schematic diagram of a display interface according to an embodiment of the present disclosure.
Figure 3:
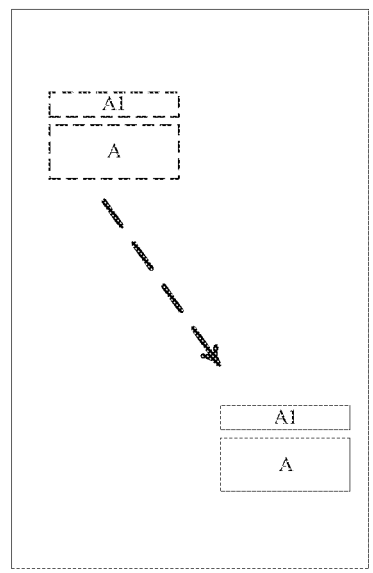
FIG. 3 is a schematic diagram of a target moving process according to an embodiment of the present disclosure.

For the embodiments of the present disclosure, for the convenience of description, a specific embodiment is taken as an example to illustrate the display effects provided by the embodiment of the present disclosure. As shown in FIG. 2, the image data may be displayed through a first interface 201. Optionally, the image data are video data. The video is played through the first interface 201, while music is played. Based on a position of a target object A in the video, a position of corresponding lyrics A1 is adjusted. As shown in FIG. 2, the target object is at the upper left of the video, and then the corresponding lyrics A1 appears at the upper left of the video. Optionally, as shown in FIG. 3, when the video and music are played, if the target object moves from the upper left of the video to the lower right of the video, the corresponding lyrics will also move to the lower right of the video with the target object. Optionally, when the target object A is moving, its depth information is getting deeper and deeper, that is, the distance of the target object A from the video capture device is getting farther and farther, and the effects of the lyrics A1 may be adjusted accordingly.

In the embodiment of the present disclosure, the multimedia data and music data to be displayed are played based on the lyric video display operation of the user. The multimedia data includes image data, and the music data includes audio data and lyrics. At the same time, the target object in the image data and the target lyrics in the lyrics are determined, the target lyrics are displayed near the target object, and the display effects of the lyrics are adjusted based on the depth information of the target object to embed the lyrics into the real space of the image data, thereby providing the user a sensory experience of virtual display and thus better user experiences.

Figure 4:
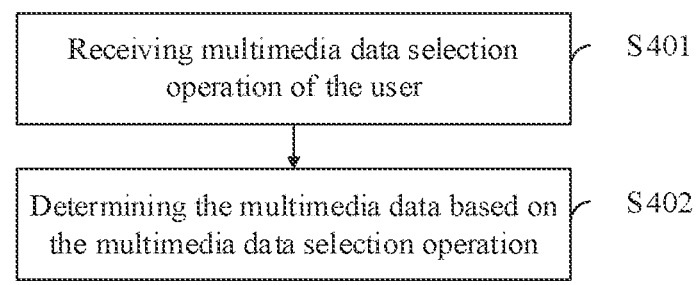
FIG. 4 is a schematic flowchart of a method for obtaining multimedia data according to an embodiment of the present disclosure.

In some embodiments, as shown in FIG. 4, the method further includes, prior to playing, based on the lyric video display operation of the user, the multimedia data and music data to be displayed: step S401, receiving a multimedia data selection operation of a user; and step S402: determining the multimedia data based on the multimedia data selection operation.

In an embodiment of the present disclosure, the user may select desired multimedia data from the multimedia data stored locally. Optionally, the selecting may be formed through touch selection, or through voice, action, or the like.

Figure 5:
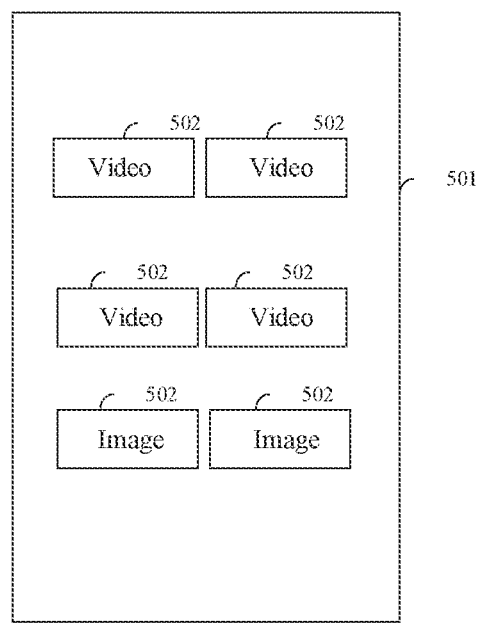
FIG. 5 is a schematic flowchart of a method for a user to capture multimedia data according to an embodiment of the present disclosure.

For the embodiment of the present disclosure, for the convenience of description, a specific embodiment is taken as an example. As shown in FIG. 5, a multimedia data selection operation of a user is received and a multimedia data selection interface 501 is displayed. The multimedia data selection interface 501 has multimedia data 502 for selection, and multimedia data that the user wants to be synthesized into the lyrics video are determined based on the selection operation of the user.

In the embodiment of the present disclosure, the user may select the multimedia data that he/she wants to be synthesized into the lyrics video on his/her own, and the user may select different multimedia data according to his/her own needs to improve the user experience.

Figure 6:
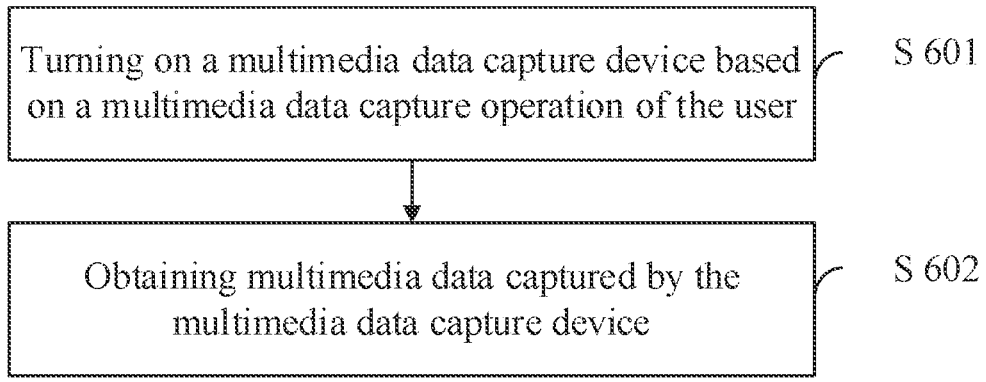
FIG. 6 is a schematic diagram of a multimedia data selection interface according to an embodiment of the present disclosure.

In some embodiments, as shown in FIG. 6, the method further includes, prior to said playing, based on the lyric video display operation of the user, the multimedia data and music data to be displayed: step S601, turning on the multimedia data capture device in response to a multimedia data capture operation of a user; and step S602, obtaining multimedia data captured by the multimedia data capture device.

In an embodiment of the present disclosure, the user may capture the multimedia data through a user terminal, and the user terminal should be provided with a multimedia data capture device or an external multimedia data capture device, optionally an image capture device.

For the embodiment of the present disclosure, for the convenience of description, a specific embodiment is taken as an example. The user terminal is a mobile phone with a camera, and the multimedia data capture operation of the user is received through the mobile phone. Optionally, the multimedia data capture operation may be the touch operation of the user, the camera for collection is turned on in response to the touch operation, and image data are captured through the camera.

In an embodiment of the present disclosure, the user can shoot videos by himself or herself and synthesize the videos, with a broader video selection range and better user experience.

Figure 7:
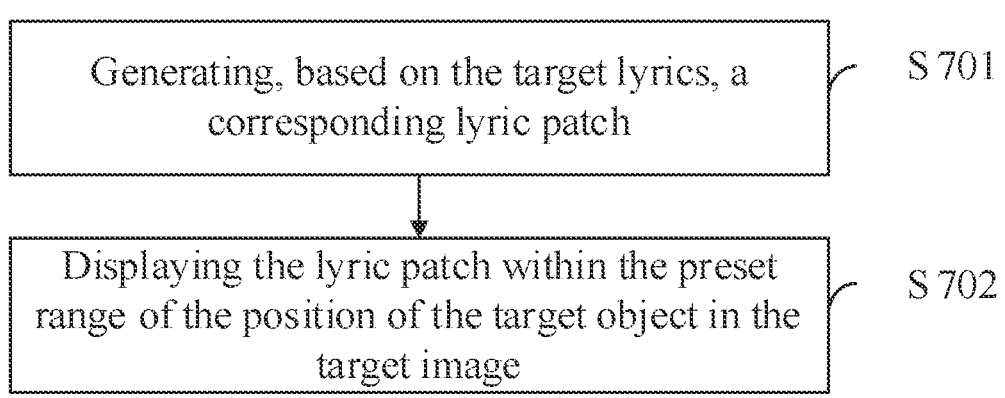
FIG. 7 is a schematic flowchart of a method for generating lyrics patches according to an embodiment of the present disclosure.

In some embodiments, as shown in FIG. 7, said displaying the target lyrics within the preset range of the position of the target object in the target image includes: step S701, generating a corresponding lyric patch based on the target lyrics; and step S702, displaying the lyrics patch within the preset range of the position of the target object in the target image.

In the embodiment of the present disclosure, the lyric patch is a form of presentation corresponding to the lyrics. For example, the lyric patch may be a picture showing the lyrics, or a moving picture, which may display the content of the lyrics. Optionally, one sentence of lyrics corresponds to one lyric patch, or one long sentence of lyrics corresponds to multiple lyric patches, or multiple short sentences of lyrics correspond to one lyric patch, and different correspondences present different display effects. Optionally, one sentence of lyrics corresponds to one lyric patch.

In some embodiments, said generating the corresponding lyric patch based on the target lyrics includes: performing sentence-splitting or word-splitting processing on the target lyrics to generate the corresponding lyric patch.

In some embodiments, the lyric patch has a lyric content displayed therein, and the method further includes, when generating the corresponding lyric patch: composing the lyric content displayed in the lyric patch.

In some embodiments, said composing the lyric content displayed in the lyric patch includes: composing the words of the lyrics displayed in the lyric patch, in accordance with at least one of the number of words, a font, a color, an alignment manner, and a display position of the lyrics in the lyric patch.

In the embodiment of the present disclosure, when the lyric patches are generated in accordance with the lyrics of the music, the lyrics in the music are obtained, and the lyrics are sentence-split and word-split according to preset rules, such as forming one sentence of lyrics into a lyric patch, or forming several words in one sentence of lyrics into a lyric patch, or composing multiple sentences of lyrics to form a lyric patch. Optionally, when the lyric patch is formed, the lyrics are composed. Optionally, the font, color, etc. of the lyrics may be adjusted to finally form a picture or animation that can display a lyric content.

For the embodiment of the present disclosure, for the convenience of description, a specific embodiment is taken as an example. The lyrics of the music are obtained, and a sentence-splitting processing is performed on the lyrics, and each sentence of the lyrics forms a corresponding lyric patch. Optionally, the lyric patch has a lyric content displayed therein. Optional, the lyrics may be composed according to preset rules, such as specifying the number of words in each line of the lyrics, the font of the lyrics, alignment, etc. Optionally, each lyric patch may have a different number of words of the lyrics displayed therein, the display position of the lyrics in each lyric patch may be different, and the alignment of the lyrics in each lyric patch may be different.

The embodiment of the present disclosure obtains the lyrics of the music, and generates a corresponding lyric patch for each sentence of the lyrics, so as to achieve a diversity of the lyric patches and richer display effects.

Figure 8:
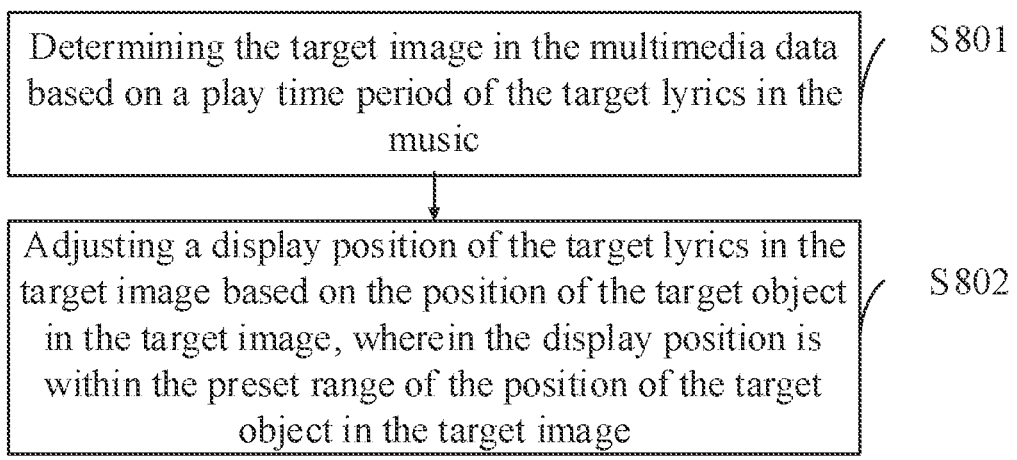
FIG. 8 is a schematic flowchart of a method for adjusting a position of lyrics according to an embodiment of the present disclosure.

In some embodiments, as shown in FIG. 8, said displaying the target lyrics within a preset range of the position of the target object in the target image includes: step S801, determining, based on a play time period of the target lyrics in the music, a target image data in the multimedia data; and step S802, adjusting, based on a position of the target object in the target image data, a display position of the target lyrics in the image data, where the display position is within a preset range of the position of the target object in the target image data.

In the embodiment of the present disclosure, when the lyrics is combined with the target object in the image data, the time period during which the lyrics appear in the music is required to correspond to the time period during which the target object appears in the image data so as to ensure that the target object may appear in the image data when the lyrics appear.

For the embodiment of the present disclosure, for the convenience of description, a specific embodiment is taken as an example. For lyrics B, the time period during which the corresponding lyrics appear in the music is from 35S to 38S, then a target image within the time period from 35S to 38S in the image data is determined, a target object B1 that always exists in the target image is determined as the target object corresponding to the lyrics B, and the position of the lyric patch is determined based on position information of the target object B1 in the image data. As an embodiment of the present disclosure, the position where the lyrics appear may also be an area near the display position of the target object corresponding to the lyrics.

In the embodiment of the present disclosure, a corresponding relationship between the lyric patch and the target object is determined by the time when the lyrics corresponding to the lyric patch appear in the music and the time when the target object appears in the image data, so as to realize that the lyrics can appear in the data image when being played, and the user may see the lyrics.

In some embodiments, said adjusting, based on the depth information of the target object in the image data, the display effects of the target lyrics includes: adjusting, based on depth information of the target object in the target image, a display size of the target lyrics.

Figure 9:
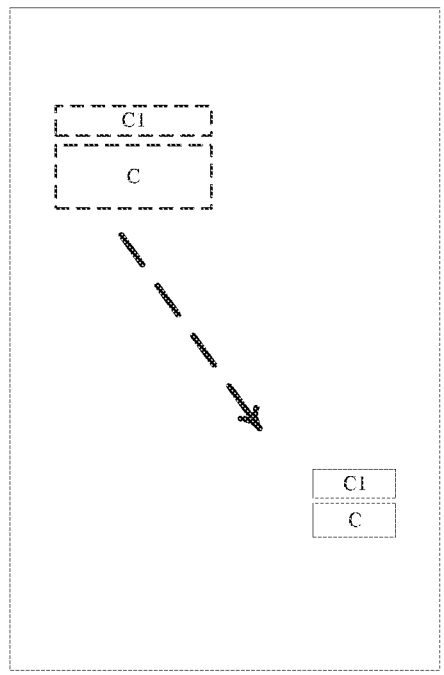
FIG. 9 is a schematic diagram of an effect adjustment according to an embodiment of the present disclosure.

In the embodiment of the present disclosure, said adjusting the display effects of the lyrics patch may be adjusting the display size of the lyrics. For the convenience of description, a specific embodiment is taken as an example. As shown in FIG. 9, in the process of playing the image data, the target object C1 is distanced farther and farther from the image capture device, the depth thereof becomes deeper and deeper, and then the display size of the lyrics C corresponding to the target object C1 may be adjusted to be larger and larger.

In some embodiments, said adjusting, based on the depth information of the target object, the display effects of the target lyrics includes: adjusting, based on the depth information of the target object in the target image, a display color of the lyric patch.

Optionally, the effects may be adjusted by adjusting the display color or the like of the corresponding lyric patch according to the depth information of the target object.

The embodiment of the present disclosure adjusts the display size of the lyrics corresponding to the target object according to the depth information of the target object, so as to give the user a visual experience that everything looks small in the distance and big on the contrary.

In some embodiments, the image data include video data and/or panoramic image data with Depth Of Field (DOF) information. When the image data are panoramic image data with DOF information, said displaying the target lyrics within the range of the position of the target object in the target image includes; respectively adjusting, based on positions of different target objects in the panoramic image data, display positions of target lyrics in the panoramic image data corresponding to different target objects.

Figure 10:
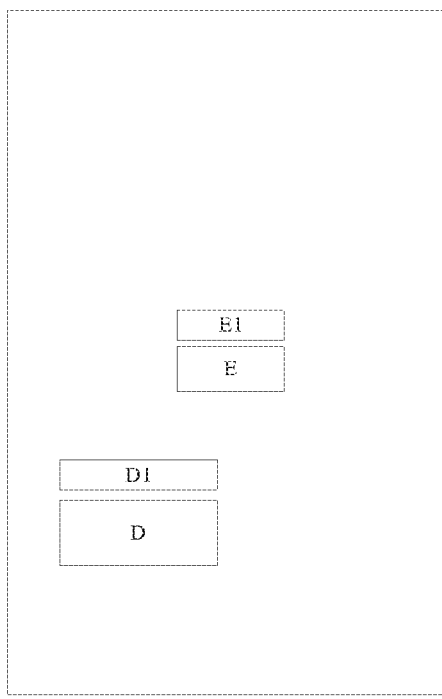
FIG. 10 is a schematic diagram of adjustment of a font size of lyrics according to an embodiment of the present disclosure.

In the embodiment of the present disclosure, for convenience of description, a specific embodiment is taken as an example. As shown in FIG. 10, a panoramic image 1001 has a target object D1 and a target object E1 contained therein, the target object D1 is at the lower left of the panoramic image, and the target object E1 is in the middle of the panoramic image. The target object D1 corresponds to the lyrics D, and the target object E1 corresponds to the lyrics E. Then, the positions of the lyrics D and the lyrics E are adjusted according to the positions of the target object D1 and the target object E1, respectively. Among them, the depth information of the target object D1 is shallower, the depth information of the target object E1 is deeper, and then the lyrics D may be adjusted to have a larger display size and the lyrics E may be adjusted to have a smaller display size.

In the embodiment of the present disclosure, the sizes of the lyrics corresponding to different target objects are adjusted based on the positions and depth information of the different target objects in the panoramic image, so as to give the user a real spatial experience.

The embodiment of the present disclosure generates the corresponding lyric patch based on the lyrics of the music, obtains the depth information of the target object in the image data based on the image data in the multimedia data, adjusts the display position in the image data of the lyrics patch corresponding to the target object based on the position information of the target object in the image data, adjusts the display effects of the corresponding lyric patch based on the depth information of the target object in the image data, and embeds the lyrics into the real space of the image data, so as to provide the user a sensory experience of virtual display and thus better user experience.

Figure 11:
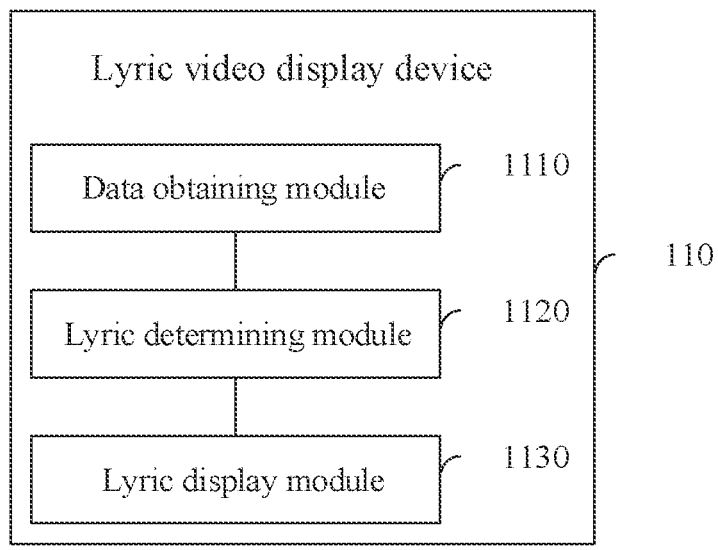
FIG. 11 is a schematic structural diagram of a lyric video display device according to an embodiment of the present disclosure.

The embodiment of the present disclosure provides a lyric video display device. As shown in FIG. 11, a lyric video display device 110 may include: a data obtaining module 1110, a lyric determining module 1120, and a lyric display module 1130.

The data obtaining module 1110 is configured to play, based on a lyric video display operation of a user, multimedia data and music data to be displayed, the multimedia data including image data, and the music data including audio data and lyrics.

The lyric determining module 1120 is configured to determine a target time point, determine a target object in the image data corresponding to the target time point, and determine target lyrics in the lyrics corresponding to the target time point.

The lyric display module 1130 is configured to display the target lyrics within a preset range of a position of the target object in the target image, and adjust display effects of the target lyrics based on depth information of the target object, while playing a part of the audio data corresponding to the target lyrics.

In some embodiments, when obtaining the multimedia data to be synthesized, the data obtaining module 1110 may be configured to receive a multimedia data selection operation of a user, and determine the multimedia data based on the multimedia data selection operation.

In some embodiments, when obtaining the multimedia data to be synthesized, the data obtaining module 1110 may be configured to turn on a multimedia data capture device based on a multimedia data capture operation of a user, and obtain multimedia data captured by the multimedia data capture device.

In some embodiments, when displaying the target lyrics within the preset range of the position of the target object in the target image, the lyric display module 1130 may be configured to generate a corresponding lyric patch based on the target lyrics, and display the lyric patch within the preset range of the position of the target object in the target image.

In some embodiments, when generating the corresponding lyric patch based on the target lyrics, the lyric display module 1130 may be configured to perform sentence-splitting or word-splitting processing on the target lyrics to generate the corresponding lyric patch.

In some embodiments, the lyric patch has alyric content displayed therein, and when generating the corresponding lyric patch, the lyric display module 1130 may be configured to compose the lyric content displayed in the lyric patch.

In some embodiments, when composing the lyric content displayed in the lyric patch, the lyric display module 1130 may be configured to compose the lyric content displayed in the lyric patch according to at least one of the number of words, a font, a color, an alignment manner, and a display position of the lyrics in the lyric patch.

In some embodiments, when adjusting the display effects of the target lyrics based on the depth information of the target object in the image data, the lyric display module 1130 may be configured to adjust a display color of the lyric patch based on the depth information of the target object in the target image.

In some embodiments, when displaying the target lyrics within the preset range of the position of the target object in the target image, the lyric display module 1130 may be configured to determine target image data in the multimedia data based on a play time period of the target lyrics in the music, and adjust a display position of the target lyrics in the image data based on a position of the target object in the target image data, where the display position is within a preset range of a position of the target object in the target image data.

In some embodiments, when adjusting the display position of the target lyrics in the image data based on the position of the target object in the image data, the lyric display module 1130 may be configured to adjust a display size of the target lyrics based on the depth information of the target object in the target image.

In some embodiments, the image data includes video data and/or panoramic image data with DOF information. When the image data is panoramic image data with DOF information, when displaying the target lyrics within the preset range of the position of the target object in the target image, the lyrics display module 1130 may be configured to respectively adjust, based on positions of different target objects in the panoramic image data, display positions of lyrics patches in the panoramic image data corresponding to the different target objects.

In some embodiments, before adjusting the display effects of the target lyrics based on the depth information of the target object, the lyric display module 1130 may be further configured to obtain the depth information of the target object in the image data, where the depth information of the target object indicates information about a distance of the target object from a video capture device.

The embodiment of the present disclosure generates the corresponding lyric patch based on the lyrics of music, obtains the depth information of the target object in the image data based on the image data in the multimedia data, adjusts the display position in the image data of the lyric patch corresponding to the target object based on the position information of the target object in the image data, adjusts the display effects of the corresponding lyric patch based on the depth information of the target object in the image data, and embeds the lyrics into the real space of the image data so as to provide the user a sensory experience of virtual display and thus better user experience.

Figure 12:
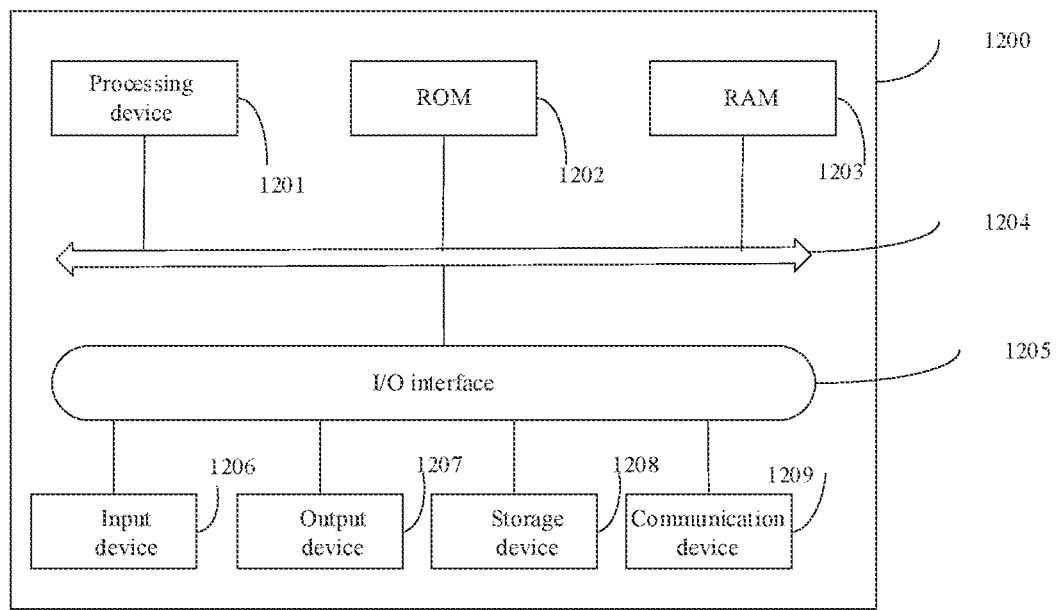
FIG. 12 is a schematic structural diagram of an electronic apparatus according to an embodiment of the present disclosure.

Reference is now made to FIG. 12, which is a schematic diagram showing an electronic apparatus 1200 adapted to implement the embodiments of the present disclosure. The electronic apparatus according to the embodiment of the present disclosure may include, but not limited to, a mobile terminal such as a mobile phone, a laptop computer, a digital broadcast receiver, a Personal Digital Assistant (PDA), a tablet computer (PAD), a Portable Multimedia Player (PMP), or a vehicle-mounted terminal (e.g., a vehicle-mounted navigation terminal), or a fixed terminal such as a digital TV, a desktop computer, etc. The electronic apparatus illustrated in FIG. 12 is exemplary only, and should not be construed as limiting the function and scope of use of the embodiments of the present disclosure.

The electronic apparatus includes a memory and a processor, wherein the processor here may be referred to as the processing device 1201 below, and the memory may include at least one of the read only memory (ROM) 1202, random access memory (RAM) 1203 and storage device 1208 below, as follows:

As illustrated in FIG. 12, the electronic apparatus 1200 may include a processing device (such as a central processing unit, a graphics processing unit, etc.) 1201, which may perform various appropriate actions and processes in accordance with programs stored in a Read Only Memory (ROM) 1202 or loaded from a storage device 1208 into a Random Access Memory (RAM) 1203. In the RAM 1203, various programs and data required for operation of the electronic apparatus 1200 may also be stored. The processing device 1201, the ROM 1202, and the RAM 1203 are connected to each other through a bus 1204. An Input/Output (I/O) interface 1205 is also connected to the bus 1204.

Generally, the following devices may be connected to the I/O interface 1205: an input device 1206 including, for example, a touch screen, a touch pad, a keyboard, a mouse, a camera, a microphone, an accelerometer, a gyroscope, etc.; an output device 1207 including, for example, a Liquid Crystal Display (LCD), a speaker, an oscillator, etc.; the storage device 1208 including, for example, a magnetic tape or a hard disk; and a communication device 1209. The communication device 1209 may allow the electronic apparatus 1200 to perform wireless or wired communication with other devices for data exchange. Although FIG. 12 illustrates the electronic apparatus 1200 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 1209, or installed from the storage device 1208, or installed from the ROM 1202. When the computer program is executed by the processing device 1201, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, a client and a server can communicate through any currently known or future-developed network protocol such as HyperText Transfer Protocol (HTTP), and can be interconnected with digital data communication (e.g., communication network) in any form or medium. Examples of communication networks include local area networks ("LAN"), wide area networks ("WAN"), network of network (for example, the Internet), and end-to-end networks (for example, ad hoc end-to-end networks), as well as any currently known or future-developed networks.

The above-mentioned computer-readable medium may be included in the above-mentioned electronic apparatus, or exist separately without being assembled into the electronic apparatus.

The above-mentioned computer-readable medium may have one or more programs carried thereon. The above-mentioned one or more programs, when executed by the electronic apparatus, causes the electronic apparatus to obtain multimedia data and music to be synthesized, the multimedia data including image data; obtain depth information of a target object in the image data; generate a lyric patch based on the lyrics of the music; adjust a display position of the lyric patch in the image data based on a position of the target object in the image data; adjust display effects of the lyric patch based on the depth information of the target object in the image data, and generate a lyric video.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate system architectures, functions, and operations that may be implemented according to the systems, methods, and computer program products of various embodiments of the present disclosure. In this regard, each block in the flowcharts or block diagrams may represent a module, program segment, or part of code, and the module, program segment, or part of code contains one or more executable instructions for realizing the specified logic function. It should also be noted that, in some alternative implementations, the functions annotated in the blocks may also occur in a different order from the order indicated in the drawings. For example, two blocks shown in succession can actually be executed substantially in parallel, or can sometimes be executed in a reverse order, depending on the functions involved. It should also be noted that each block in the block diagrams and/or flowcharts, and the combination of the blocks in the block diagrams and/or flowcharts can be implemented by a dedicated hardware-based system that performs the specified functions or operations, by a combination of dedicated hardware and computer instructions.

The modules or units involved in the embodiments described in the present disclosure can be implemented in software or hardware.

The functions described hereinabove may be performed at least in part by one or more hardware logic components. For example, without limitation, exemplary types of hardware logic components that can be used include: Field Programmable Gate Array (FPGA), Application-Specific Integrated Circuit (ASIC), Application-Specific Standard Product (ASSP), System on Chip (SOC), Complex Programmable Logical device (CPLD) and so on.

In the context of the present disclosure, the machine-readable medium may be a tangible medium, which may have a program to be used by an instruction execution system, device, or apparatus or in combination with the instruction execution system, device, or apparatus contained or stored thereon. The machine-readable medium may be a machine-readable signal medium or a machine-readable storage medium. The machine-readable medium may include, but is not limited to, an electronic, magnetic, optical, electromagnetic, infrared, or semiconductor system, device, or device, or any suitable combination thereof. More specific examples of the machine-readable storage medium include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof.

According to one or more embodiments provided in the present disclosure, a lyric video display method is provided. The method includes: playing, based on a lyric video display operation of a user, multimedia data and music data to be displayed, the multimedia data including image data, and the music data including audio data and lyrics; determining a target time point, determining a target object in the image data corresponding to the target time point, and determining target lyrics in the lyrics corresponding to the target time point; displaying the target lyrics within a preset range of a position of the target object in the target image, and adjusting display effects of the target lyrics based on depth information of the target object, while playing a part of the audio data corresponding to the target lyrics.

In some embodiments, the method further includes, prior to said playing, based on the lyric video display operation of the user, the multimedia data and the music data to be displayed: receiving a multimedia data selection operation of a user; and determining the multimedia data based on the multimedia data selection operation.

In some embodiments, the method further includes, prior to said playing, based on the lyric video display operation of the user, the multimedia data and the music data to be displayed: turning on, based on a multimedia data capture operation of a user, a multimedia data capture device; and obtaining multimedia data captured by the multimedia data capture device data.

In some embodiments, said displaying the target lyrics within the preset range of the position of the target object in the target image includes: generating, based on the target lyrics, a corresponding lyric patch; and displaying the lyric patch within the preset range of the position of the target object in the target image.

In some embodiments, said generating, based on the target lyrics, the corresponding lyric patch includes performing sentence-splitting or word-splitting processing on the target lyrics to generate the corresponding lyric patch.

In some embodiments, the lyric patch has a lyric content displayed therein, and the method further includes, when generating the corresponding lyric patch: composing the lyric content displayed in the lyric patch.

In some embodiments, said composing the lyric content displayed in the lyric patch includes composing the lyric content displayed in the lyric patch in accordance with at least one of the number of words, a font, a color, an alignment manner, and a display position of lyrics in the lyric patch.

In some embodiments, said adjusting, based on the depth information of the target object, the display effects of the target lyrics includes adjusting, based on the depth information of the target object in the target image, a display color of the lyric patch.

In some embodiments, said displaying the target lyrics within the preset range of the position of the target object in the target image includes: determining, based on a play time period of the target lyrics in the music, target image data in the multimedia data; and adjusting, based on a position of the target object in the target image data, a display position of the target lyrics in the image data, where the display position is within a preset range of a position of the target object in the target image data.

In some embodiments, said adjusting, based on the depth information of the target object, the display effects of the target lyrics includes: adjusting, based on the depth information of the target object in the target image, a display size of the target lyrics.

In some embodiments, the image data includes video data and/or panoramic image data with DOF information, where, when the image data is panoramic image data with DOF information, said displaying the target lyrics within the preset range of the position of the target object in the target image includes: respectively adjusting, based on positions of different target objects in the panoramic image data, display positions of target lyrics in the panoramic image data corresponding to the different target objects.

In some embodiments, the method further includes, prior to said adjusting, based on the depth information of the target object, the display effects of the target lyrics: obtaining the depth information of the target object in the image data, where the depth information of the target object indicates information about a distance of the target object from a video capture device.

According to one or more embodiments provided in the present disclosure, a lyric video display device is provided, including: a data obtaining module configured to play, based on a lyric video display operation of a user, multimedia data and music data to be displayed, the multimedia data including image data, and the music data including audio data and lyrics; a lyric determining module configured to determine a target time point, determine a target object in the image data corresponding to the target time point, and determine target lyrics in the lyrics corresponding to the target time point; and a lyric display module configured to display the target lyrics within a preset range of a position of the target object in the target image, and adjust display effects of the target lyrics based on depth information of the target object, while playing a part of the audio data corresponding to the target lyrics.

In some embodiments, when obtaining the multimedia data to be synthesized, the data obtaining module may be configured to receive a multimedia data selection operation of a user; and determine the multimedia data based on the multimedia data selection operation.

In some embodiments, when obtaining the multimedia data to be synthesized, the data obtaining module may be configured to turn on a multimedia data capture device based on a multimedia data capture operation of a user, and obtain multimedia data captured by the multimedia data capture device.

In some embodiments, displaying the target lyrics within the preset range of the position of the target object in the target image, the lyric display module may be configured to generate a corresponding lyric patch based on the target lyrics, and display the lyric patch within the preset range of the position of the target object in the target image.

In some embodiments, when generating the corresponding lyric patches based on the target lyrics, the lyric display module may be used to perform sentence-splitting or word-splitting processing on the target lyrics to generate the corresponding lyric patch.

In some embodiments, the lyric patch has a lyric content displayed therein, and when generating the corresponding lyric patch, the lyric display module may be configured to compose the lyric content displayed in the lyric patch.

In some embodiments, when composing the lyric content displayed in the lyric patch, the lyric display module may be configured to compose the lyric content displayed in the lyric patch according to at least one of the number of words, a font, a color, an alignment manner, and a display position of the lyrics in the lyric patch.

In some embodiments, when adjusting the display effects of the target lyrics based on the depth information of the target object in the image data, the lyric display module may be configured to adjust a display color of the lyric patch based on the depth information of the target object in the target image.

In some embodiments, when displaying the target lyrics within the preset range of the position of the target object in the target image, the lyric display module may be configured to determine target image data in the multimedia data based on a play time period of the target lyrics in the music, and adjust a display position of the target lyrics in the image data based on a position of the target object in the target image data, where the display position is within a preset range of a position of the target object in the target image data.

In some embodiments, when adjusting the display position of the lyric patch in the image data based on the position of the target object in the image data, the lyric display module may be configured to adjust a display size of the target lyrics based on the depth information of the target object in the target image.

In some embodiments, when adjusting the display effects of the lyric patch based on the depth information of the target object in the image data, the lyric display module may be configured to adjust, based on the depth information of the target object in the image data, a display size of the lyric patch.

In some embodiments, the image data includes video data and/or panoramic image data with DOF information. When the image data is panoramic image data with DOF information, when displaying the target lyrics within the preset range of the position of the target object in the target image, the lyrics display module may be configured to respectively adjust, based on positions of different target objects in the panoramic image data, display positions of lyric patches in the panoramic image data corresponding to the different target objects.

In some embodiments, before adjusting the display effects of the target lyrics based on the depth information of the target object, the lyric display module may be further configured to obtain the depth information of the target object in the image data, where the depth information of the target object indicates information about a distance of the target object from a video capture device.

According to one or more embodiments provided in the present disclosure, an electronic apparatus is provided. The electronic apparatus includes: one or more processors; a memory, and one or more application programs stored in the memory and configured to be executed by the one or more processors to implement the lyric video display method of the foregoing embodiment.

According to one or more embodiments provided in the present disclosure, a computer-readable medium is provided, and the medium has at least one instruction, at least one program segment, a code set, or an instruction set stored thereon, and the at least one instruction, the at least one program segment, the code set, or the instruction set is configured to be loaded and executed by a processor to implement the lyric video display method described in the foregoing embodiment.

The above description are only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by arbitrarily combining the above technical features or the equivalent features thereof without departing from the above disclosed concepts, for example, technical solutions formed by mutual replacement of the above-mentioned features and the technical features disclosed in the present disclosure (but not limited to) with similar functions.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of methods, it should be understood that the subject matter defined in the appended claims is not necessarily limited to the specific features or actions described above. On the contrary, the specific features and actions described above are merely exemplary forms of implementing the claims.

What is claimed is:

1. A lyric video display method, comprising:
playing, based on a lyric video display operation of a user, multimedia data and music data to be displayed, the multimedia data comprising image data, and the music data comprising audio data and lyrics;
determining a target time point, determining target lyrics in the lyrics corresponding to the target time point, and determining from the image data a target object corresponding to the target time point and associated with the target lyrics, wherein said determining from the image data the target object corresponding to the target time point and associated with the target lyrics comprises: determining, according to sentence-splitting, a lyric corresponding to the target time point from the lyrics as the target lyrics; determining a time period during which the lyric determined as the target lyrics appears in the music data; determining a plurality of target images during the time period from the image data; and determining an object that exists in the plurality of target images as the target object associated with the target lyrics; and
displaying the target lyrics within a preset neighborhood of a position of the target object in the image data, and adjusting display effects of the target lyrics based on depth information of the target object, while playing a part of the audio data corresponding to the target lyrics, the target object being at any position in the image data,
wherein the display effects of the target lyrics comprise a display size of the target lyrics, and
said adjusting the display effects of the target lyrics based on the depth information of the target object comprises:
during continuous movement of the target object in the lyric video, continuously moving the target lyrics separate from the target object along with the target object and keeping the target lyrics separate from the target object within the preset neighborhood around the position of the target object as the target object continuously moves in a horizontal direction parallel to a display screen, while continuously increasing or decreasing the display size of the target lyrics separate from the target object as the target object continuously moves in a depth direction perpendicular to the display screen to get shallower or deeper.

2. The method according to claim 1, further comprising, prior to said playing, based on the lyric video display operation of the user, the multimedia data and the music data to be displayed:
receiving a multimedia data selection operation of the user; and
determining the multimedia data based on the multimedia data selection operation.

3. The method according to claim 1, further comprising, prior to said playing, based on the lyric video display operation of the user, the multimedia data and the music data to be displayed:
turning on a multimedia data capture device based on a multimedia data capture operation of the user; and
obtaining multimedia data captured by the multimedia data capture device.

4. The method according to claim 1, wherein displaying the target lyrics within the preset neighborhood of the position of the target object in the image data comprises:
generating, based on the target lyrics, a corresponding lyric patch; and
displaying the lyric patch within the preset neighborhood of the position of the target object in the image data.

5. The method according to claim 4, wherein said generating the corresponding lyric patch based on the target lyrics comprises:
performing sentence-splitting or word-splitting processing on the target lyrics to generate the corresponding lyric patch.

6. The method according to claim 5, wherein the lyric patch has a lyric content displayed therein, and the method further comprises, when generating the corresponding lyric patch:
composing the lyric content displayed in the lyric patch.

7. The method according to claim 6, wherein said composing the lyric content displayed in the lyric patch comprises:
composing the lyric content displayed in the lyric patch in accordance with at least one of a number of words, a font, a color, an alignment manner, and a display position of lyrics in the lyric patch.

8. The method according to claim 4, wherein said adjusting the display effects of the target lyrics based on the depth information of the target object comprises:
adjusting a display color of the lyric patch based on the depth information of the target object in the image data.

9. The method according to claim 1, wherein said displaying the target lyrics within the preset neighborhood of the position of the target object in the image data comprises:
determining the image data in the multimedia data based on a play time period of the target lyrics in the music; and
adjusting a display position of the target lyrics in the image data based on the position of the target object in the image data, wherein the display position is within the preset neighborhood of the position of the target object in the image data.

10. The method according to claim 1, wherein adjusting the display effects of the target lyrics based on the depth information of the target object comprises:
adjusting a display size of the target lyrics based on the depth information of the target object in the image data.

11. The method according to claim 1, wherein the image data comprises video data and/or panoramic image data with Depth Of Field (DOF) information, wherein, when the image data is the panoramic image data with the DOF information, said displaying the target lyrics within the preset neighborhood of the position of the target object in the image data comprises: respectively adjusting, based on positions of different target objects in the panoramic image data, display positions of target lyrics in the panoramic image data corresponding to the different target objects.

12. The method according to claim 1, further comprising, prior to said adjusting the display effects of the target lyrics based on the depth information of the target object:
obtaining the depth information of the target object in the image data, wherein the depth information of the target object indicates information about a distance of the target object from a video capture device.

13. An electronic apparatus, comprising:
one or more processors;
a memory; and
one or more application programs stored in the memory and configured to be executed by the one or more processors to implement the lyric video display method according to claim 1.

14. The method according to claim 1, further comprising:
sequentially obtaining, from the lyrics according to a playback order of sentences of the lyrics, each sentence of the lyrics as the target lyrics;

determining a respective play time period corresponding to each sentence of the lyrics;

determining an object appearing in the image data during the respective play time period as the target object, wherein for each sentence of the lyrics and the corresponding object appearing in the image data during the respective play time period, displaying the target lyrics within a preset neighborhood around the position of the target object in the image data, and adjusting the display effects of the target lyrics based on the depth information of the target object, while playing a part of the audio data corresponding to the target lyrics, the target object being at any position in the image data.

15. The method according to claim 14, wherein:

said determining the object appearing in the image data during the respective play time period as the target object comprises: determining more than one target objects when more than one objects appear in the image data during the respective play time period, wherein during continuous movements of the more than one target objects in the lyric video, more than one target lyrics corresponding respectively to the more than one target objects are displayed simultaneously, and each of the more than one target lyrics continuously moves along with its corresponding target object and stays within a preset neighborhood around the position of the corresponding target object as the corresponding target object continuously moves in the horizontal direction parallel to the display screen, while the display size of each of the more than one target lyrics is continuously increased or decreased as the corresponding target object continuously moves in the depth direction perpendicular to the display screen to get shallower or deeper.

16. A lyric video display device, comprising:

a data obtaining module configured to play, based on a lyric video display operation of a user, multimedia data and music data to be displayed, the multimedia data comprising image data, and the music data comprising audio data and lyrics;

a lyric determining module configured to determine a target time point, determine target lyrics in the lyrics corresponding to the target time point, and determine from the image data a target object corresponding to the target time point and associated with the target lyrics, wherein the lyric determining module is configured to: determine, according to sentence-splitting, a lyric corresponding to the target time point from the lyrics as the target lyrics; determine a time period during which the lyric determined as the target lyrics appears in the music data; determine a plurality of target images during the time period from the image data; and determine an object that exists in the plurality of target images as the target object associated with the target lyrics; and a lyric display module configured to display the target lyrics within a preset neighborhood of a position of the target object in the image data, and adjust display effects of the target lyrics based on depth information of the target object, while playing a part of the audio data corresponding to the target lyrics, the target object being at any position in the image data, wherein the display effects of the target lyrics comprise a display size of the target lyrics, and the lyric display module is configured to:

during continuous movement of the target object in the lyric video, continuously move the target lyrics separate from the target object along with the target object and keep the target lyrics separate from the target object within the preset neighborhood around the position of the target object as the target object continuously moves in a horizontal direction parallel to a display screen, while continuously increase or decrease the display size of the target lyrics separate from the target object as the target object continuously moves in a depth direction perpendicular to the display screen to get shallower or deeper.

17. A non-transitory computer-readable medium having at least one instruction, at least one program segment, a code set, or an instruction set stored thereon, where the at least one instruction, the at least one program segment, the code set, or the instruction when loaded and executed by a processor, causes the processor to:

play, based on a lyric video display operation of a user, multimedia data and music data to be displayed, the multimedia data comprising image data, and the music data comprising audio data and lyrics;

determine a target time point, determine target lyrics in the lyrics corresponding to the target time point, and determine from the image data a target object corresponding to the target time point and associated with the target lyrics, wherein the at least one instruction, the at least one program segment, the code set, or the instruction when loaded and executed by the processor, causes the processor to: determine, according to sentence-splitting, a lyric corresponding to the target time point from the lyrics as the target lyrics; determine a time period during which the lyric determined as the target lyrics appears in the music data; determine a plurality of target images during the time period from the image data; and determine an object that exists in the plurality of target images as the target object associated with the target lyrics; and display the target lyrics within a preset neighborhood of a position of the target object in the image data, and adjust display effects of the target lyrics based on depth information of the target object, while playing a part of the audio data corresponding to the target lyrics, the target object being at any position in the image data, wherein the display effects of the target lyrics comprise a display size of the target lyrics, and the at least one instruction, the at least one program segment, the code set, or the instruction when loaded and executed by the processor, causes the processor to:

during continuous movement of the target object in the lyric video, continuously move the target lyrics separate from the target object along with the target object and keep the target lyrics separate from the target object within the preset neighborhood around the position of the target object as the target object continuously moves in a horizontal direction parallel to a display screen, while continuously increase or decrease the display size of the target lyrics separate from the target object as the target object continuously moves in a depth direction perpendicular to the display screen to get shallower or deeper.

* * * * *